Nov. 2, 1948.   C. V. GAGEN   2,452,647
CONTROL VALVE
Filed Nov. 25, 1944
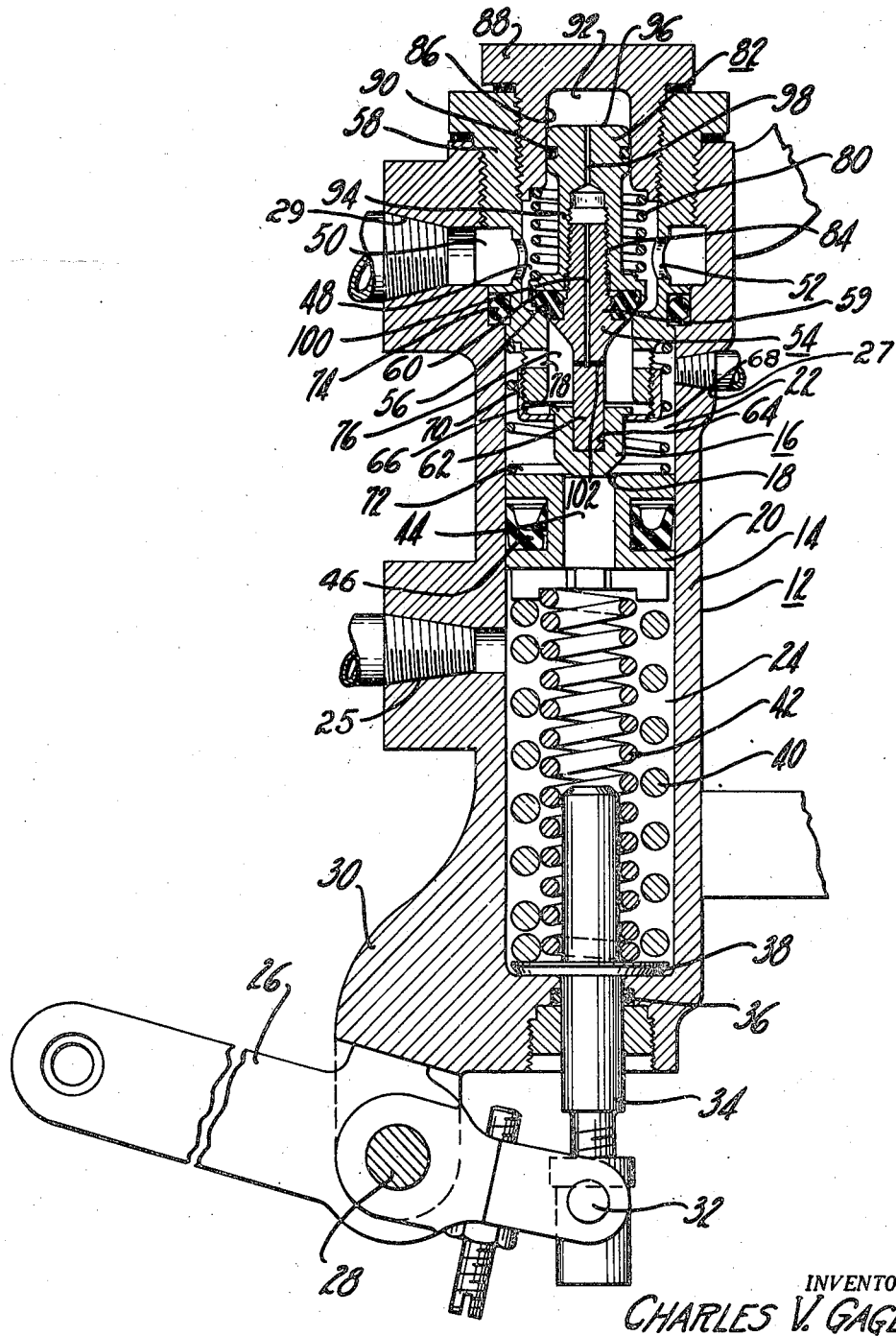
INVENTOR.
CHARLES V. GAGEN
BY
ATTORNEY Patented Nov. 2, 1948

2,452,647

UNITED STATES PATENT OFFICE 2,452,647

CONTROL VALVE

Charles V. Gagen, South Bend, Ind., assignor to Bendix Aviation Corporation, South Bend, Ind., a corporation of Delaware Application November 25, 1944, Serial No. 565,068

6 Claims. (Cl. 303—54)

This invention relates to control valves, sometimes called regulating or reducing valves, which are manually operated to regulate or control the admission of fluid under high pressure to a fluid pressure operable motor.

An object of the present invention is to provide a control or reducing valve which will be capable of accomplishing well graduated and highly sensitive regulation of a fluid pressure controlled motor, regardless of the pressure differential between said motor and the pressure source. This is particularly important where the pressure source, such as an accumulator, maintains an extremely high pressure, while a relatively low pressure is sufficient for operation of the particular device in question, such as a brake applying means.

A further object of the present invention is to accomplish the aforementioned object with a structure which is simple, compact, and inexpensive.

A still further object of the present invention is to provide a control or reducing valve in which an inlet valve of a given size permits a relatively large volume of fluid to move from the pressure source to the motor in a relatively short space of time, by virtue of a slight lag in communication of the motor pressure to the pressure responsive surface which is arranged to bring the valve to lapped position.

Other objects and advantages of the present invention will become apparent during the course of the following description, reference being had therein to the accompanying drawing, in which:

The figure is a cross-sectional view of a reducing valve incorporating my invention.

Said figure shows a control or reducing valve 12 which has ports in communication with a source of pressure, a fluid reservoir, and a motor, and which is adapted to be manually operated to first cut off communication between the motor and reservoir, and subsequently open communication between the source of pressure and the motor to actuate the latter.

Within the valve casing 14 is an outlet valve member 16 which is in the position shown when the motor is released, but which seats at 18 on the piston 20 to cut off communication between chamber 22 and chamber 24 whenever the piston 20 is moved by the operator to cause a building of pressure in the controlled motor. The force exerted by the operator may be applied through a lever 26 pivoted at 28 on an extension 30 of the casing of the control valve and pivotally connected at 32 to a rod 34 which extends into the interior of the control valve casing through a seal 36. The rod 34 may be provided with a collar 38 which acts through springs 40 and 42 on piston 20, the springs being provided in order that the operator will be required to move the lever 26 progressively farther as the pressure in the controlled motor is increased. Thus the position of the operator operated member constitutes an indication of the amount of work being done by the controlled motor. The chamber 24 in which the springs are located is connected by means of a suitable port 25 to a fluid reservoir. A longitudinal passage 44 is provided in piston 20 and, while valve member 16 remains away from its seat, chamber 22 is in communication with the reservoir. Said chamber 22 is connected by means of a suitable port 27 to the motor which is under the control of the valve. This motor may be used for any desired purpose, as for example the operation of brakes. A sealing device 46 is used to prevent the escape of fluid from chamber 22 to chamber 24 when valve member 16 is seated at 18.

Chamber 48 within the control valve casing is in communication at all times with the pressure source, such as the usual accumulator. The port 29 which is directly connected to the accumulator opens into chamber 50, which in turn is in communication with chamber 48 through a plurality of openings 52. Chamber 48 is normally cut off from chamber 22 by means of a valve element 54 which seats, as shown, at 56 on a shoulder provided in the member 58 which is screwed into the end of the valve casing. Valve member 54, which may include a metal portion 59 on which is mounted a rubber sealing portion 60, is provided with an extension or stem 62 which abuts against valve member 16. For guiding purposes, the stem 62 may extend into an opening 64 provided in said member 16, as shown. In order to prevent the valve member 16 from floating back to its seat after the pressure in the motor has been released, a flange 66 on said valve member is adapted to contact a shoulder 68 on a nut 70 screwed on the inner end of member 58.

When valve member 54 moves away from its seat 56, fluid in chamber 48 is in communication with fluid in chamber 76 and, through a plurality of ports 78, with chamber 22, which in turn is in communication with the controlled motor.

A spring 72 acts on piston 30 urging it toward its released position. In order to insure effective sealing of the fluid in chamber 50 from the fluid in chamber 22, a sealing member 74 may be provided, as shown. A spring 80 exerts a force urging valve member 54 toward its seat.

When the operator wishes to cause actuation of the controlled motor, he moves lever 26 in a counterclockwise direction, moving rod 34 into the interior of casing 14 to exert a force through springs 40 and 42 on piston 20. When piston 20 has been moved a sufficient distance to bring the valve seat 18 into contact with valve member 16, communication is cut off between the motor and the reservoir. Subsequent movement of piston 20 acts through valve member 16 against the stem 62 of valve member 54 to move said valve member away from its seat 56 and permit fluid under pressure from the pressure source to communicate with chamber 22 and thus with the controlled motor, building up a pressure therein to accomplish the required actuation. As pressure builds up in chamber 22 it exerts a force against piston 20 tending to move the piston against the force exerted by the operator. This provides a "feel" or reaction on the operator operated member which indicates the amount of pressure developed in the controlled motor. When sufficient pressure is exerted on piston 20 to move it toward retracted position, compressing the springs 40 and 42, the valve 54 will once again move to its seat 56, thereby cutting off the motor from the source of pressure. In this situation, with both valves 54 and 16 closed, the valve device is said to be in lapped position. A reduction of the operator's pressure on piston 20 will permit chamber 22 to again communicate with chamber 24, thereby releasing the pressure in the controlled motor.

In order to permit a relatively large flow of fluid through the inlet valve 54 during a short period of time, the diameter of said valve should be quite large, as shown. In many valves previously used, the entire area of the inlet valve has been subjected to the pressure of the fluid in the pressure source. It will be obvious that, with a relatively large valve diameter, the subjection of the entire valve area to the pressure at the pressure source will create a very large force tending to hold the valve 54 on its seat, assuming chamber 22 is in communication with the reservoir. With an arrangement of this type, a large force must be extered by the operator to open the inlet valve, but once this force has been exerted the pressure in the motor will be built up to a considerable extent before the inlet valve is again closed by pressure acting back against the piston. The result is a jumpy and erratic action caused by the violent alternate opening and closing of the inlet valve.

The present invention eleminates the deficiency by reducing the initial pressure required to open the inlet valve to a minimum. This is done by having only a relatively small effective area of the inlet valve subjected to the pressure prevailing in the pressure source. In the present case said area is equal to the difference between the area of valve seat 56 and the area of a piston or plunger member 82 which constitutes, in effect, a part of the inlet valve, the plunger in the present case being screwed on the end of the inlet valve as shown at 84. The end of plunger 82 farthest from the inlet valve 54 operates in a bore 86 provided in a plug 88 screwed into the end of member 58, a seal 90 being located between chamber 92 at the front of bore 86 and chamber 48. It is desirable that the seal 90 be effective in both directions, both to prevent flow of fluid from chamber 48 to chamber 92, and to prevent flow of fluid from chamber 92 to chamber 48. The diameter of the middle portion 94 of the combined inlet valve and plunger is not of any importance insofar as the fluid pressures are concerned. In other words, this portion could have a much smaller diameter or a much larger diameter without effecting the principles of operation of the invention. The material consideration, as stated before, is the relationship between the area of valve seat 56 and the area of plunger 82 operating in bore 92. The difference between these two areas constitutes the effective area which is subjected to the pressure of the pressure source tending to hold valve element 54 on its seat. It is assumed, of course, that the area of valve element 56 is greater than the area of plunger 82. The total pressure then normally tending to hold the inlet valve 54 on its seat is the fluid pressure acting on this small area plus the strength of spring 80. It will be apparent that the force required by the operator to overcome the pressure biasing valve element 54 to its seat will be relatively light, and therefore the valve will be relatively sensitive and facile in operation.

However, after valve element 54 has been moved from its seat, and chamber 48 has been brought into communication with chambers 76 and 22, the pressure in said chamber 76 will gradually increase. Since this pressure is acting on the underside of valve element 54 tending to move said valve element away from its seat, it will be apparent that, unless a balancing or counteracting means is provided to compensate for the building up of pressure in chamber 76, the point will be reached at which the pressure in chamber 76 acting on the full cross-sectional area represented by valve seat 56 will overcome the pressure of the fluid in the pressure source acting on the relatively small area represented by the difference between the area of valve seat 56 and the area of plunger 82. If this condition should ever occur, the inlet valve 56 would remain open and the controlled motor would remain locked under full pressure.

In order to compensate for the increase of pressure in chamber 76, a pressure responsive surface must be provided which has substantially the same area as valve seat 56 and through which the increasing pressure in the motor can act in an opposite direction to the action of the pressure in chamber 76, or in other words, the balancing surface must be so arranged that pressure exerted thereon will tend to move valve element 54 toward its seat. Rather than provide an independent piston to serve as a balancing device, I utilize the forward surface 96 of plunger 82. Thus, by connecting chamber 92 to chamber 76, I can counteract in large measure the effect of an increase of pressure in chamber 76 as the controlled motor is actuated. Therefore, interconnecting passages 98, 100 and 102 are provided through plunger 82 and valve member 54 to connect chambers 76 and 92.

Not only does the provision of the passage connecting chambers 76 and 92 simplify the construction of the inlet valve by reducing the number of parts and the number of seals that would otherwise be required, but, a second advantage of equal or greater importance is gained.

The cross-sectional area of the passage is made sufficiently small to provide, in effect, a restricted flow of fluid between chambers 76 and 92. This means that, as fluid under pressure flows from chamber 48 to chamber 76 and thus to the motor, the flow of such fluid to chamber 92 is slightly delayed, with the result that the inlet valve tends to open wider and to remain open longer than would otherwise be the case. This slight time lag in balancing of the pressure in chamber 76 permits a relatively large volume of liquid to move past the inlet valve during the time it is open. One of the requirements for a control valve of this type is that the valve be able to accommodate a large volume of fluid in a short period of time. The valve is expected to do this whether it is applied fully or only slightly applied. As the piston 20 is moved only a small percentage of its total travel, the ordinary inlet valve will only open a small amount, thus limiting the amount of fluid able to move from chamber 48 to chamber 76. With the present valve, although the piston 20 is moved only a small percentage of its total travel, the passage which interconnects chambers 76 and 92 acts as a restriction and consequently the pressure in chamber 76 does not immediately have full effect against surface 96. At the same time the force exerted by the fluid to overcome the restrictive effect of the passage as the fluid moves through said passage increases the force tending to open the inlet valve. The result is a wider valve opening, allowing a much greater volume of fluid than would be allowed if the inlet valve were balanced immediately. In other words, it may be said that the restrictive effect of the passage serves to delay balancing of the inlet valve, thus allowing the pressure differential between chambers 76 and 92 to widen the valve opening. The dashpot effect of the construction due to the restriction provided by the passage also serves to prevent "flutter" of the inlet valve, since jerkiness in movements of the valve is resisted.

Although a particular embodiment of my invention has been described, it will be understood by those skilled in the art that the objects of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a control valve for a fluid pressure system, said valve having an inlet port adapted to be connected to a source of pressure, an exhaust port adapted to be connected to a reservoir, an outlet port adapted to be connected to a controlled motor, and exhaust valve means controlling communication between the outlet port and the exhaust port; an inlet valve construction for controlling communication between the inlet port and the outlet port comprising a valve element cutting off such communication when seated and held on its seat by the pressure of the aforesaid pressure source, and a piston member connected to said valve element and having two opposed pressure responsive surfaces, the first of which is subjected to the pressure prevailing in the pressure source to assist in moving the valve element from its seat, and the second of which is subjected to the pressure prevailing in the motor to gradually counteract the effect of the pressure acting on said first piston surface as the pressure in the motor increases, said piston member and valve element being provided with a passage extending therethrough to permit communication of the motor side of the inlet valve with said second piston surface, said passage having a cross-sectional area arranged to restrict the flow of fluid therethrough in order that pressure increases occurring in the motor will not be immediately effective in urging the valve element toward its seat.

2. In a control valve for a fluid pressure system, said valve having an inlet port adapted to be connected to a source of pressure, an exhaust port adapted to be connected to a reservoir, an outlet port adapted to be connected to a controlled motor, and exhaust valve means controlling communication between the outlet port and the exhaust port; an inlet valve construction for controlling communication between the inlet port and the outlet port comprising a valve element cutting off such communication when seated and held on its seat by the pressure of the aforesaid pressure source, and a piston member connected to said valve element and having two opposed pressure responsive surfaces, the first of which is subjected to the pressure prevailing in the pressure source to assist in moving the valve element from its seat, and the second of which is subjected to the pressure prevailing in the motor to gradually counteract the effect of the pressure acting on said first piston surface as the pressure in the motor increases, said piston member and valve element being provided with a passage extending therethrough to permit communication of the motor side of the inlet valve with said second piston surface, said passage having a cross-sectional area arranged to restrict the flow of fluid.

3. In a control valve for a fluid pressure system, said valve having an inlet port adapted to be connected to a source of pressure, an exhaust port adapted to be connected to a reservoir, an outlet port adapted to be connected to a controlled motor, and exhaust valve means controlling communication between the outlet port and the exhaust port; an inlet valve construction for controlling communication between the inlet port and the outlet port comprising a valve element cutting off such communication when seated and held on its seat by the pressure of the aforesaid pressure source, and a plunger extension on said valve element which reduces the area of said valve element subjected to the pressure of said pressure source, said plunger extension having a pressure responsive surface which is subjected to the pressure prevailing in the motor to balance the effect of the pressure in the motor acting on the valve element tending to move it away from its seat, said valve element and plunger extension being provided with a passage extending therethrough to permit communication of the motor side of the inlet valve with said pressure responsive surface, said passage having a cross-sectional area arranged to restrict the flow of fluid.

4. In a control valve having a first chamber provided with an outlet port, a second chamber provided with an inlet port, and a bore extending outwardly from one side of said second chamber; a valve construction for controlling communication between said chambers comprising a valve seat formed between said chambers, a valve element in the second chamber adapted to contact said seat to cut off communication between said chambers, the unit pressure at the inlet port acting on the valve element in such a way as to tend to hold said valve element on its seat, a plunger-like extension carried by said valve element and extending into said bore, said plunger-like extension having a cross-sectional area slightly less than the cross-sectional area of the valve seat, thereby reducing, although not entirely eliminating, the fluid-developed force tending to hold the valve element seated, and a passage extending longitudinally through said valve element and its plunger-like extension to provide continuous communication between the first chamber and the portion of the aforementioned bore beyond the end of the plunger-like extension.

5. In a control valve having a first chamber provided with an outlet port, a second chamber provided with an inlet port, and a bore extending outwardly from one side of said second chamber, a valve construction for controlling communication between said chambers comprising a valve seat formed between said chambers, a valve element in the second chamber adapted to contact said seat to cut off communication between said chambers, the unit pressure at the inlet port acting on the valve element in such a way as to tend to hold said valve element on its seat, a plunger carried by said valve element and extending into said bore, a seal associated with said plunger to prevent passage of fluid between the second chamber and the portion of the bore beyond the end of the plunger, and a restricted passage extending longitudinally through said valve element and the plunger to provide continuous communication between the first chamber and the portion of the bore beyond the end of the plunger, the cross-sectional area of at least a portion of said passage being small enough to cause a time lag between an increase of the unit pressure in the first chamber and a corresponding increase of the unit pressure in the end of the bore.

6. In a control valve for a fluid pressure system, said valve having an inlet port, an exhaust port, an outlet port, and exhaust valve means controlling communication between the outlet port and the exhaust port; an inlet valve construction for controlling communication between the inlet port and the outlet port comprising a valve element cutting off such communication when seated and held on its seat by the pressure at the inlet port, and a pressure responsive member connected to said valve element and having two opposed pressure responsive surfaces, the first of which is subjected to pressure prevailing at the inlet port to assist in moving the valve element from its seat, and the second of which is subjected to the pressure prevailing at the outlet port to gradually counteract the effect of the pressure acting on said first pressure responsive surface as the pressure at the outlet port increases, the outlet side of the valve element and the second pressure responsive surface of the aforementioned member being interconnected by means of a restricted passage which insures a slight time lag between pressure increases at the outlet port and corresponding pressure increases at the second pressure responsive surface of said member.

CHARLES V. GAGEN.

REFERENCES CITED

The following references are of record in the file of this patent:

UNITED STATES PATENTS

| Number | Name | Date |
|---|---|---|
| 2,040,590 | Avery | May 12, 1936 |
| 2,365,531 | Du Bois | Dec. 19, 1944 |

FOREIGN PATENTS

| Number | Country | Date |
|---|---|---|
| 408,011 | Great Britain | Apr. 5, 1934 |